Feb. 17, 1970  D. O. GALLENTINE  3,496,514
TEST FIXTURE
Filed April 12, 1967

INVENTOR.
DONAL O. GALLENTINE

BY Martin L. Kuch  ATTY.

United States Patent Office 3,496,514
Patented Feb. 17, 1970

3,496,514
TEST FIXTURE
Donal O. Gallentine, Orlando, Fla., assignor to General Dynamics Corporation, a corporation of Delaware
Filed Apr. 12, 1967, Ser. No. 630,328
Int. Cl. H05k 1/18; H01r 13/50
U.S. Cl. 339—17
9 Claims

ABSTRACT OF THE DISCLOSURE

A fixture for facilitating access for a probe to test points in the circuit printed on a printed circuit card is described. The test points are provided by lands on the cards which extend to an edge thereof. The fixture includes a slotted block which is yieldable so that it locks in place when the slot thereof is received by the edge of the printed circuit card. The block includes a plurality of channels, each aligned with a different one of the lands which provide the test points. Holes in an edge of the card are in communication with the channels. These holes are adapted to receive the probe, which when inserted therein contacts the test point lands.

---

This invention relates to a test fixture which is adapted to cooperate with printed circuit cards.

Printed circuit cards are usually arranged in stacks with the circuit portions thereof closely adjacent to each other so as not to permit access to test points within the circuit for maintenance, repair and overhaul purposes. It has been suggested to extend the printed circuit lands to an edge of the card so as to make the test points more readily available The space between these lands, however, is quite limited. Accordingly, it is difficult to locate a test probe on a desired land. Moreover, improper positioning of the test probe may short circuit the equipment and cause permanent damage thereto.

Accordingly, it is an object of the present invention to provide an improved test fixture for facilitating access to test points on a printed circuit card, notwithstanding their closely spaced relationship.

It is another object of the present invention to provide an improved test fixture for facilitating the alignment of a test probe with test points on a printed circuit card which fixture is inexpensive and which reduces the time and expense of testing a printed circuit card.

It is a further object of the present invention to provide an improved test fixture for aligning a probe in contacting relationship with test points on a printed circuit card which may readily be installed onto the card, even after final assembly of the equipment utilizing the card which can readily be removed from the card if desired.

It is a still further object of the present invention to provide a test point fixture for printed circuit cards which may readily be locked in place and removed without special tools.

Briefly described, a fixture in accordance with the invention is adapted to be received by a printed circuit card having a plurality of conductive lands on the surface thereof which extend to an edge of the card. A body of flexible material which is preferably an insulating plastic material is provided. The fixture has a slot therein for receiving an edge of the card. At least one of the side walls of the body which defines the slot has a plurality of channels therein, each aligned with a different one of the lands. The back wall of the body has a plurality of holes which communicate with different ones of the channels. The test probe may be inserted into any one of these holes and is directed by the channel into contacting relationship with a land. A high density of test points may be accommodated, inasmuch as the channels may be close to each other. A feature of the fixture is that it may be in stalled by inserting it into each of a plurality of closely spaced stacked cards after final assembly of the cards into the equipment. The fixture provides a spring locking action when inserted on a card so that special tools are not required for installation thereof. Moreover, the card may be provided with holes which may be in registry with a hemispherical portrusion extending from the walls of the body which define the slot. These holes receive the protrusions when the fixture is inserted in the card and lock the fixture onto the card. The card may readily be removed by lifting the walls of the body away from the card near the locking holes.

The invention itself, both as to its organization and method of operation, as well as additional objects and advantages thereof will become more readily apparent from a reading of the following description in connection with the accompanying drawings in which.

Figure 1:
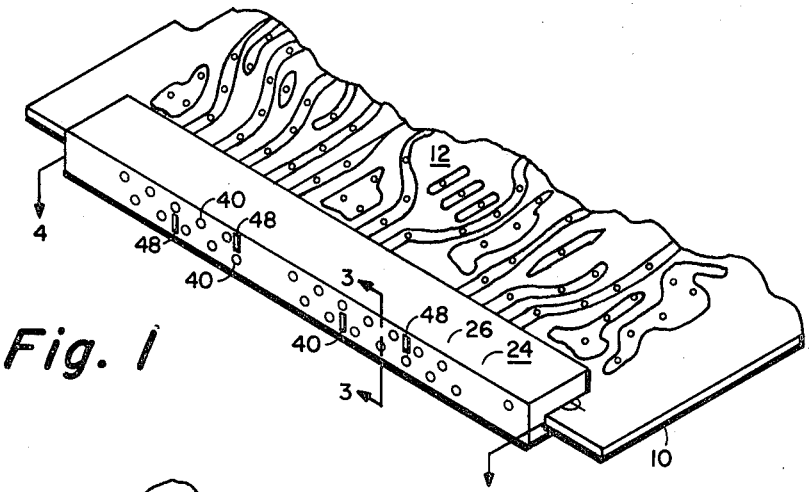
FIG. 1 is a perspective view of a fixture embodying the invention inserted on an edge of a printed circuit card.
Figure 2:
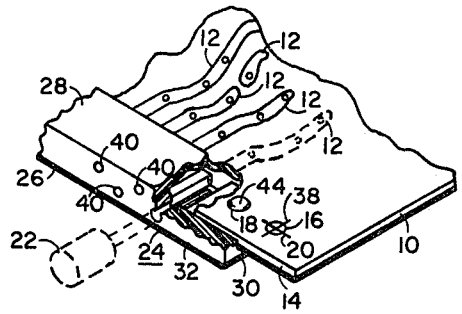
FIG. 2 is a fragmentary perspective view of the fixture and card shown in FIG. 1, the view being broken away to show internal construction of the fixture.
Figure 3:
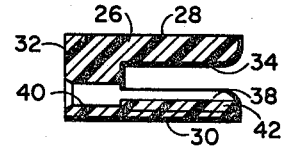
FIG. 3 is a cross-sectional view of the fixture taken along the line 3—3 of FIG. 1.
Figure 4:
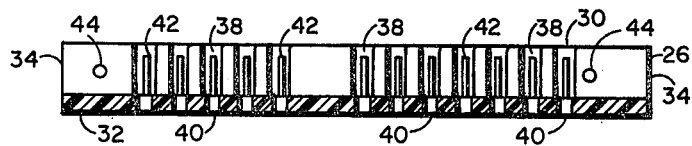
FIG. 4 is a cross-sectional view of the fixture taken along the line 4—4 in FIG. 1.

Referring to the drawings, there is shown a printed circuit card 10 having a circuit printed thereon in the form of conductive lands 12 on the top and bottom surfaces of the card. Certain of the lands which provides test points extend to an edge 14 of the card. It will be observed that these test point lands are closely spaced with respect to each other. The card also has an alignment indicia 16 in spaced relation near the corners of the card. The right hand of one of these indicia is shown in FIGS. 1 and 2. The card also has three holes 18, one of which is shown in FIG. 2, which extend therethrough. These holes are in registry with the indicia 16 as, for example, by being disposed along one of the lines 20 of the indicia which extends parallel to the edge 14 of the card. The conductive lands 12 are adapted to be contacted by a test probe 22 which is shown in a dotted outline in FIG. 2.

The fixture 24 itself is in the form of a block 26 of yieldable insulating material. The plastic material Cycolac T-7247, manufactured by the Marbon Chemical Division of Borg-Warner, Inc., has been found suitable. Cycolac is an acrylonitrile butadiene styrene copolymer material.

The body 26 may be molded so as to have two spaced walls 28 and 30 and a back wall 32. The side walls form a slot 34 which receives the edge 14 of the card so that the test point lands 12 are within the slot and within the perimeter of the body 26. A plurality of channels 38 are formed in the side walls 28 and 30. These channels are aligned with different ones of the test point lands when the block 26 is inserted into the fixture in a manner whereby the ends 34 of the block 26 are disposed along the lines 38 in the indicia 16 which are perpendicular to the edge 14. The back wall has a plurality of holes 40 therein, each of which communicates with a different one of the channels 38. The side walls which define the channels also have ridges 42 molded therein. Accordingly, the test probe is inserted into the holes which extend into the channels and is guided by the ridge therein into contact with the proper test point land 12.

Two hemispherical protrusions 44 are provided on the lower one of the side walls 30 near the ends thereof and approximately in the center of the upper side wall 28. These protrusions 44 are received within the holes 18 when the body is installed on the card 10 in alignment with the indicia 16. The body may readily be locked in place therefore, without any special tools. Merely by lifting the side walls 26 in the region of the protrusions, the fixture may readily be removed from the card, again without special tools. It is desirable that the clearance provided by the slot be slightly less than the thickness of the printed circuit card so that the fixture may be held in place by friction in the event that the locking holes and protrusions are not desired.

It will be observed that the holes 40 and the channels 38 which cooperate respectively with the test point lands on the upper and lower surfaces of the card 10 are offset with respect to each other. This offset corresponds to the offset between the conductive test point lands on the upper and lower surfaces of the card and permits a higher packing density of test points. The protrusions 48 which extend from the back wall 32 of the body 26 are provided to facilitate in the molding process. The holes may be molded, color coded, or otherwise marked to indicate the test point which is aligned therewith.

From the foregoing description it will be apparent that there has been provided an improved fixture which is being adapted for use with printed circuit cards. While a preferred embodiment of the fixture has been described, it will be appreciated that variations and modifications thereof within the scope of the invention will undoubtedly suggest themselves to those skilled in the art. Accordingly, the foregoing description should be taken as merely illustrative and not in any limiting sense.

What is claimed is:

1. A fixture adapted to receive a printed circuit card having a plurality of conductive lands on at least one surface thereof for aligning a probe into contacting relationship with different ones of said lands, said fixture comprising
   (a) a body of flexible material having a back wall and two spaced side walls which define a slot for receiving an edge of said printed circuit card so that said lands are within the perimeter of said body, the clearance provided by the slot being slightly less than the thickness of said card so that said side walls flex and spread apart when said card is inserted into said slot and said fixture is then firmly held on said card after being so inserted,
   (b) the surface of at least one of said side walls defining a plurality of channels, each aligned with a different one of said lands, and
   (c) said back wall having a plurality of probe receiving holes therein, each communicating with a different one of said channels and dimensioned to provide clearance for said probe, said holes being substantially of the same cross-sectional area as said probe, and each of said holes having a portion of the periphery thereof substantially aligned with a different one of said lands so that the surface of said probe comes into contacting relationship with said lands when inserted into said holes.

2. The invention as set forth in claim 1 wherein said printed circuit card also has conductive lands on the surface thereof opposite to said one surface, and wherein the other of said side walls has another plurality of channels therein, each aligned with a different one of the lands on said opposite surface of said printed circuit card, said back wall having an additional plurality of probe receiving holes of a cross-sectional area and location similar to the holes aligned with said lands on said one surface, each communicating with a different one of said last named channels and dimensioned to provide clearance for said probe.

3. The invention as set forth in claim 2 wherein said channels which are aligned with said lands on different ones of said surfaces are offset with respect to each other.

4. The invention as set forth in claim 1 wherein said one side wall has a plurality of ridges protruding therefrom, each disposed in a different one of said channels, said ridges extending along said channels for guiding said contacting surface of said probe into contacting relationship with said lands of said probe is inserted into said channels.

5. The invention as set forth in claim 1 wherein said slot extends lengthwise from end to end of said body whereby said card can enter said slot when it is wider than said body.

6. The invention as set forth in claim 1 wherein said body is a rectangular block of insulating material, and wherein said printed circuit card has alignment indicia thereon in registry with said lands which are adapted to be aligned with the opposite ends of said block.

7. The invention as set forth in claim 1 wherein at least one of said side walls has a protrusion thereon adapted to be received in a hole through said printed circuit card for locking said body on said card.

8. The invention as set forth in claim 1 wherein one of said side walls has a plurality of said protrusions thereon, and wherein the other of said side walls has at least one protrusion thereon, each adapted to be received in a different hole in said card.

9. The invention as set forth in claim 1 wherein said body is composed of acrylonitrile butadiene styrene copolymer material.

References Cited

UNITED STATES PATENTS

| 2,572,448 | 10/1951 | Child. |
| 2,911,612 | 11/1959 | Jackson et al. |
| 2,928,063 | 3/1960 | Gammel. |
| 3,144,288 | 8/1964 | Grant. |

FOREIGN PATENTS

| 235,047 | 2/1960 | Australia. |

MARVIN A. CHAMPION, Primary Examiner

PATRICK A. CLIFFORD, Assistant Examiner

U.S. Cl. X.R.

339—176